(12) United States Patent
Vernon

(10) Patent No.: US 7,441,941 B2
(45) Date of Patent: Oct. 28, 2008

(54) SHAKER WITH RECIPROCATING AGITATOR

(76) Inventor: Robert D Vernon, 7015 E. Louisiana Ave., Denver, CO (US) 80224

(*) Notice: Subject to any disclaimer, the term of this patent is extended or adjusted under 35 U.S.C. 154(b) by 248 days.

(21) Appl. No.: 11/119,733

(22) Filed: May 3, 2005

(65) Prior Publication Data
US 2006/0250887 A1    Nov. 9, 2006

(51) Int. Cl.
*A47J 43/27* (2006.01)
(52) U.S. Cl. .................... 366/130; 366/130; 366/332
(58) Field of Classification Search ............... 366/130, 366/212, 240, 332, 342, 343; 220/568; 604/82, 604/92; 222/196.5; 241/168, 169; 206/220; 267/166, 168, 169, 180
See application file for complete search history.

(56) References Cited

U.S. PATENT DOCUMENTS

| | | | |
|---|---|---|---|
| 395,303 A | 12/1888 | Wuchner | |
| 627,363 A * | 6/1899 | Taylor | 222/196.5 |
| 632,044 A | 8/1899 | Chapman | |
| 737,267 A | 8/1903 | Overbaugh | |
| 1,060,419 A | 4/1913 | Benjamin | |
| 1,354,626 A * | 10/1920 | Service | 222/227 |
| 1,931,087 A * | 10/1933 | Schwarz et al. | 222/196.5 |
| 2,006,296 A * | 6/1935 | Christensen | 131/177 |
| 2,086,321 A * | 7/1937 | Kudo | 267/204 |
| 2,442,486 A * | 6/1948 | Evers | 222/196.5 |
| 2,545,240 A * | 3/1951 | Patoe | 241/69 |
| 3,136,532 A | 6/1964 | Rudnick | |
| 3,862,751 A * | 1/1975 | Schwaller | 267/91 |
| 4,010,934 A | 3/1977 | McCord | |
| 4,737,036 A | 4/1988 | Offermann | |
| 5,482,261 A * | 1/1996 | Ortega | 267/168 |
| 5,544,960 A | 8/1996 | Sommovigo | |
| 5,580,169 A | 12/1996 | Ghidini | |
| 5,780,087 A | 7/1998 | Brady | |
| 6,231,226 B1 | 5/2001 | Neidigh | |
| 6,379,032 B1 * | 4/2002 | Sorensen | 366/130 |

FOREIGN PATENT DOCUMENTS

DE    1161795    12/1964

* cited by examiner

*Primary Examiner*—David L Sorkin
(74) *Attorney, Agent, or Firm*—The Harris Firm

(57) ABSTRACT

A handheld shaker with a reciprocating agitator, comprising a mixing vessel that operatively contains a guide rod that runs from one end of the vessel to an opposite end of the vessel. The mixing vessel is operatively connected to both such ends. The shaker also uses a hollow agitator frame that operatively reciprocates from the one end of the vessel to the opposite end, and thereby mixes fluid contained within the vessel. A reciprocating agitator is also disclosed.

10 Claims, 5 Drawing Sheets

SHAKER WITH RECIPROCATING AGITATOR

FIELD OF THE INVENTION

The present invention relates to a shaker for mixing and agitating fluids. More particularly, the present invention relates to a shaker and agitator that mix liquids quickly, uniformly and easily.

BACKGROUND OF THE INVENTION

Pancake batters, dietary supplements drinks, baby formulas and nutritional shakes often require an agitation or dispersion mechanism for optimal mixing and dispersion of their powdered constituents. Several such mechanisms include an agitator attached to a mixing container. These attached or fixed agitators may have a semi-permanent connection to the container, or they may be manufactured integrally within the container. Several such devices are described in U.S. Pat. Nos. 1,060,419 and 3,136,532. These attached elements often create cracks and crevices, however, which are difficult to clean. Furthermore, these devices often do not allow sufficient movement or reach of the agitator to the entire container area, and thus fail to provide optimal mixing.

Hand mixing the above-mentioned mixtures into a smooth, homogeneous suspension often requires a considerable amount of work as well. The powdered composition of these mixtures often clumps, forming aggregations of powder surrounded by thick layers of paste that inhibit liquid from penetrating into the clumps. These clumps may float, sink to the bottom of the container, or remain suspended at some level in the fluid. Because powder may also stick to the sides or bottom of a container and resist mixing by simple shaking, in many cases, an elastic agitator is necessary for complete dispersion of clumps and aggregations on the container walls. For example, U.S. Pat. No. 6,739,032 discloses several elastic agitators. These agitators strike the container walls in random directions with respect to their direction of compressibility, however, and thereby fail on most such contacts to compress.

Hence the prior art fails to provide an agitation element and mixture vessel combination that is effective at reaching clumps and aggregation at the top, middle and bottom of a container while utilizing the full agitating capacity of the agitator.

SUMMARY OF THE INVENTION

Thus, the present invention is directed to a shaker with an agitator that maximizes shaking efficiency by providing both adequate internal container coverage and full utilization of spring agitating capacity.

One aspect of the present invention is directed to a hand-held shaker with reciprocating agitator, comprising a mixing vessel, operatively containing a guide rod that runs from one end of the vessel to an opposite end of the vessel, and that is operatively connected to both such ends. It also has a hollow agitator frame that operatively reciprocates from the one end of the vessel to the opposite end, and thereby mixes fluid contained within the vessel.

In another aspect, the agitator frame has an internal attachment member that operatively attaches the frame to the guide rod and operatively slides along the guide rod.

In another aspect, the agitator frame can slide onto, and off of, the rod.

In yet another aspect, the agitator frame has an external mixing member, wherein the external mixing member and the internal attachment member are concentric coils.

In still another aspect, the concentric coils are made from one continuous piece of material.

In yet another aspect, the agitator frame is diamond, circular, spherical, cube, polyhedral, or pyramid-shaped.

In still another aspect, the guide rod is substantially solid.

In yet another aspect, the agitator frame operatively has a primary axis of elasticty parallel with the guide rod, and along which the frame contracts when it hits one of the vessel ends.

In still another aspect, the agitator frame has an external mixing frame comprised of concentric coils, wherein multiple coils can operatively touch the end of the vessel when the frame contracts against the end.

In yet another aspect, the agitator frame has a spring that operatively impacts the vessel's ends only at its ends.

Another aspect of the invention is directed to a reciprocating agitator, comprising a hollow agitator frame that operatively reciprocates from one end of a mixing vessel to an opposite end of the mixing vessel, and thereby mixes fluid contained within the vessel. The mixing vessel operatively contains a guide rod that runs from the one end of the vessel to the opposite end of the vessel, and that is operatively connected to both such ends.

BRIEF DESCRIPTION OF THE DRAWINGS

In the accompanying drawings, which form a part of the specification and are to be read in conjunction therewith, and in which like reference numerals are used to indicate like parts in the various views.

DETAILED DESCRIPTION OF THE INVENTION

As illustrated in the accompanying drawings and discussed in detail below, one aspect of the present invention is directed to a shaker and agitator that allow mixing of liquid and solid constituents quickly and easily when shaken by hand. The shaker and agitator of this aspect maximize the mixing capacity of the agitator by aligning the agitator's primary axis of elasticity with the direction of the agitator's movement. As a result, the agitator compresses with every contact against the vessel's walls, thereby taking full advantage of its elasticity with every vessel sidewall collision.

The shaker and agitator of this aspect also completely mix all solid and liquid constituents in every area of the mixing vessel.

Figure 1:
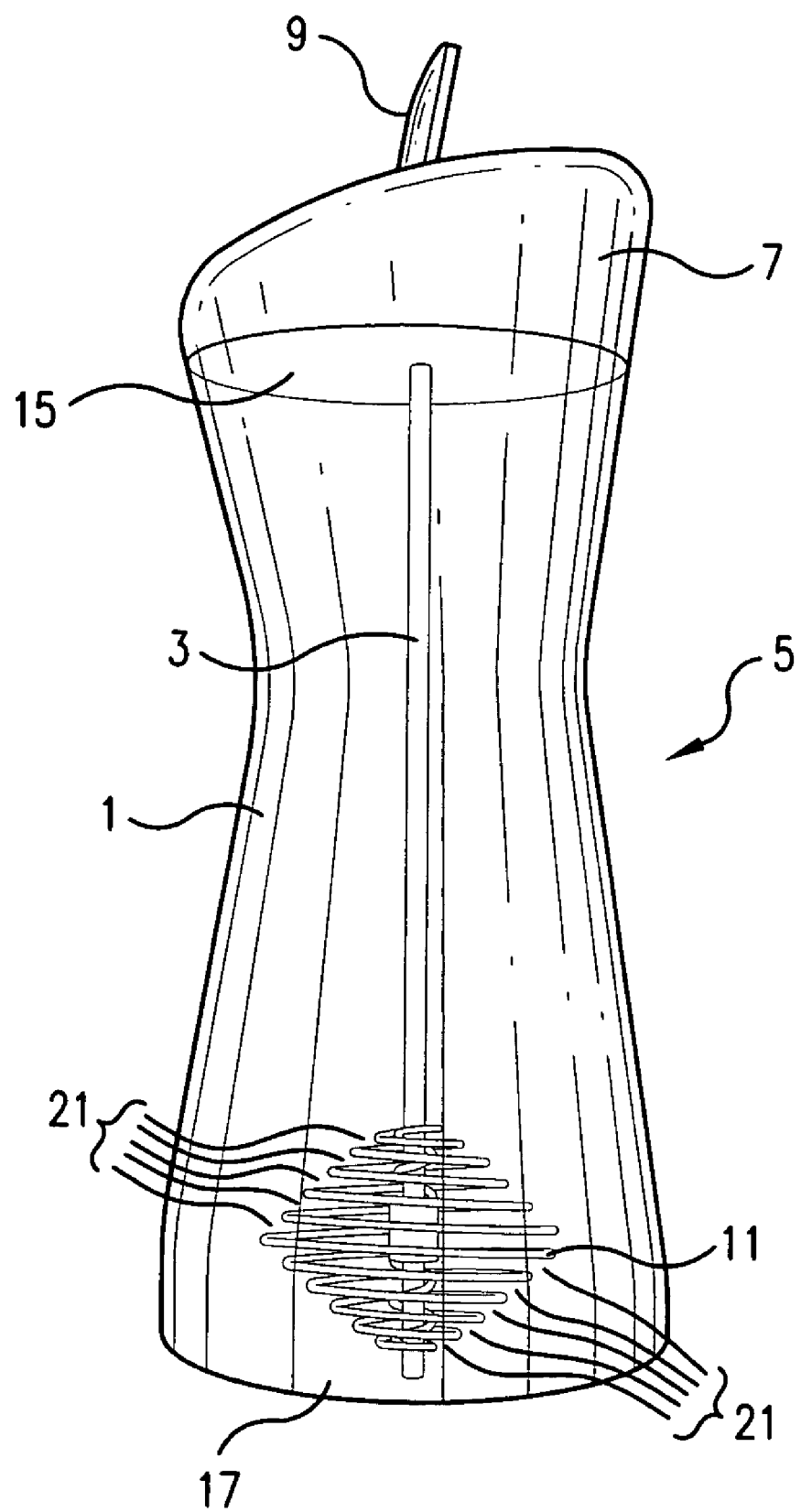
FIG. 1 is a side perspective view of a shaker and agitator according to the present invention.

Referring to FIG. 1, shaker 5 includes mixing vessel 1, screw-on top 7, snap-lid 9, guide rod 3, and spring agitator 11. Solid and liquid mixture constituents are poured into vessel 1 through an opening in screw-on top 7. Snap-lid 9 is closed and the user shakes shaker 5 back and forth along the general direction that is parallel to centrally disposed guide rod 3, which causes spring agitator 11 to slide back and forth along guide rod 3.

Vessel 1 and top 7 can be made from any material suitable for containing and agitating non-toxic liquid mixtures, including various plastics, metals and durable glass materials.

Mixture constituents are agitated as they flow through spaces 21 in spring agitator 11, which further enhances mixing by creating turbulence in the mixture as it passes from side to side—between top end 15 and bottom end 17 of vessel 1.

In one embodiment, spring agitator 11 passes from one horizontal side end to another horizontal side end of a mixing vessel.

Figure 2:
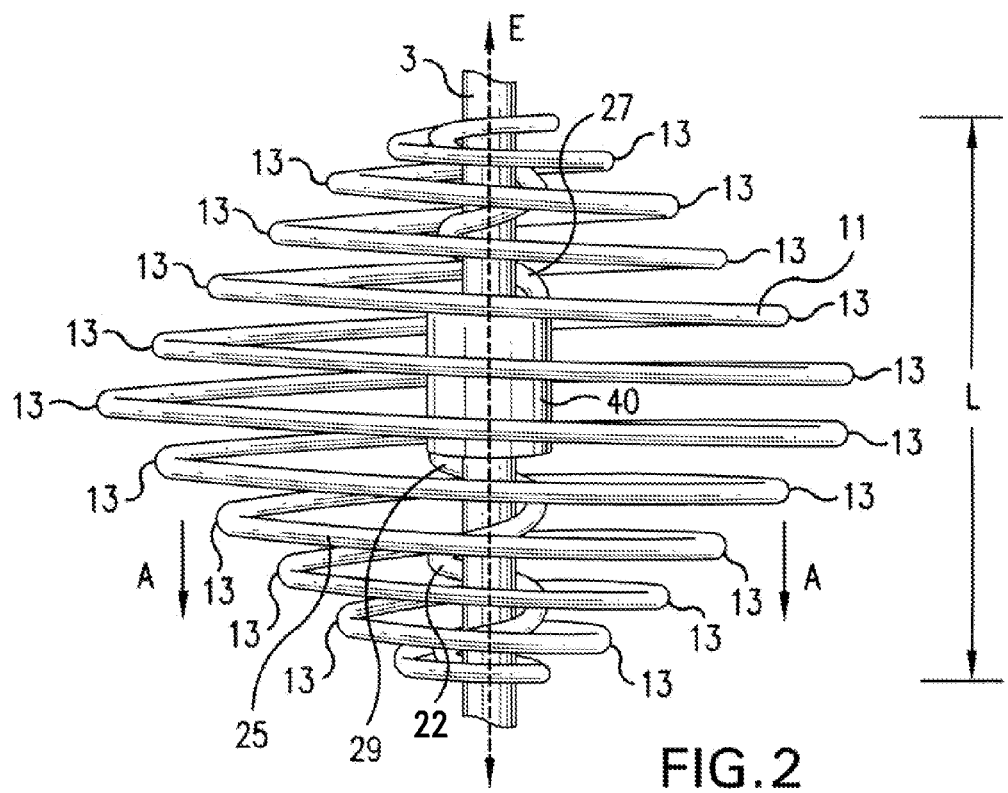
FIG. 2 is a side plan view of the agitator of FIG. 1 as it slides along the guide rod of FIG. 1.

Referring to FIG. 2, spring agitator 11 includes concentric internal 22 and external 25 coils, and weighted slide bar 40. Internal 22 and external 25 coils are made from one continuous stainless steel piece, at the ends 27 and 29 of which is attached weighted slide bar 40.

Internal coil 22 wraps very closely around guide rod 13 so that it does not provide additional agitation.

Internal coil 22 also secures every segment of the entire at rest length L of agitator 11 to rod 13, which minimizes sideways distortion or movement of the entire length of agitator 11. As such, coil 22 effectively holds the entirety of external coil 25 extremely firmly against guide rod 13, and thereby focuses all of the elastic energy of agitator 11 in the direction of its primary axis E of elasticity.

In one embodiment, internal coil 22 is replaced by an internal hollow cylinder that runs the length of agitator 11. Any guide element that trains the movement of agitator 11 almost exclusively along the direction of, or parallel to, guide rod 13, however, can be used.

Weighted slide bar 40 slides along rod 13 and provides additional centralized density, which enhances the momentum and compressibility of agitator 11. Slide bar weight 40 is made from stainless steel but can be made from any relatively dense material.

External coil 25 is diamond-shaped, which allows many of its points 13 individually to impact top end 15 and bottom end 17 of mixing vessel 1, absorb the impact, and spring back to aid mixing motion in the opposite direction.

Figure 3:
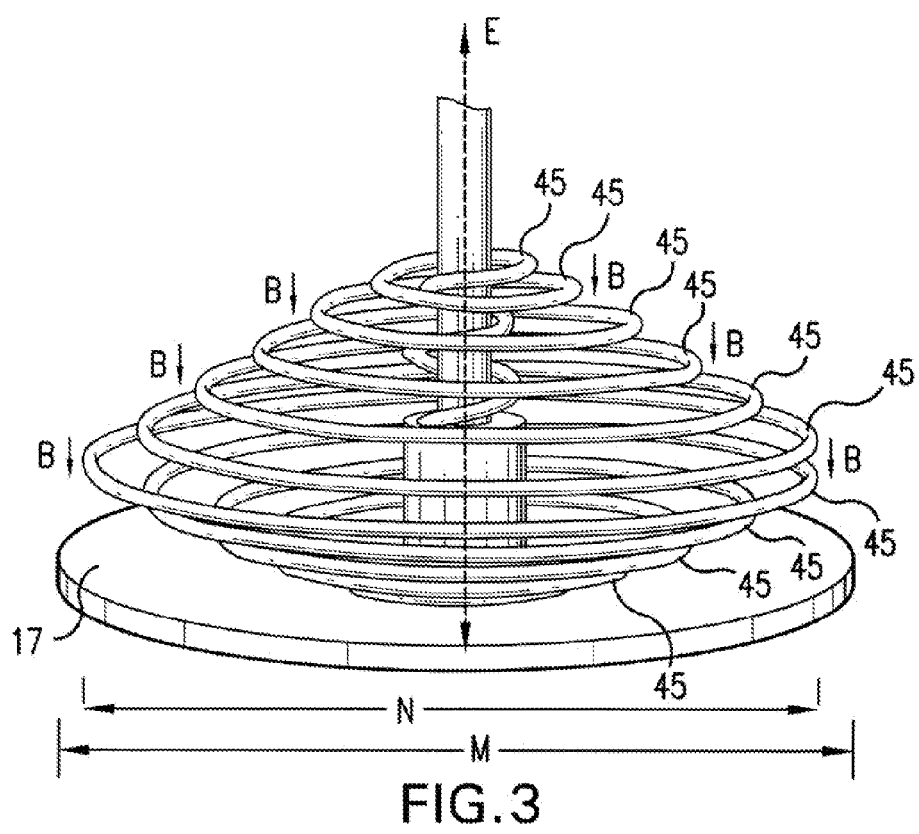
FIG. 3 is a side perspective view of the agitator of FIG. 1 as it contracts while contacting the bottom of the shaker of FIG. 1.

Referring to FIG. 3, each time spring agitator 11 travels along guide rod 13, it contacts bottom (or top 15) end 17 with a certain momentum, almost all of which is imparted along axis E, which forces each of individual rings 45 to collapse upon one another as shown by direction arrows B. The full elastic capacity of agitator 11 is fully, or almost fully, harnessed each time it strikes an inside vessel wall. As a result, the change in relative distance between rings 45, and the force exerted by rings 45, changes more frequently. This change of relative positioning between the rings 45 creates additional turbulence, which maximizes mixing efficiency.

The total diameter N formed by the largest ring 45 is just shorter than internal diameter M of vessel 1. Thus, rings 45 reach nearly every part of the internal area defined by vessel 1 so that every constituent, even constituents that may otherwise tend to stick along the sides or internal edges of vessel 1, is mixed thoroughly.

A homogeneous, or otherwise evenly dispersed mixture, quickly and easily results. Any mixture can be made using this aspect, but several mixtures are especially appropriate for its use. These include, but are not limited to, pancake batters, dietary supplements drinks, baby formulas and nutritional shakes. Other drinks where this aspect is especially useful are those which require an agitation or dispersion mechanism for optimal mixing and dispersion of powered constituents.

Figure 4A:
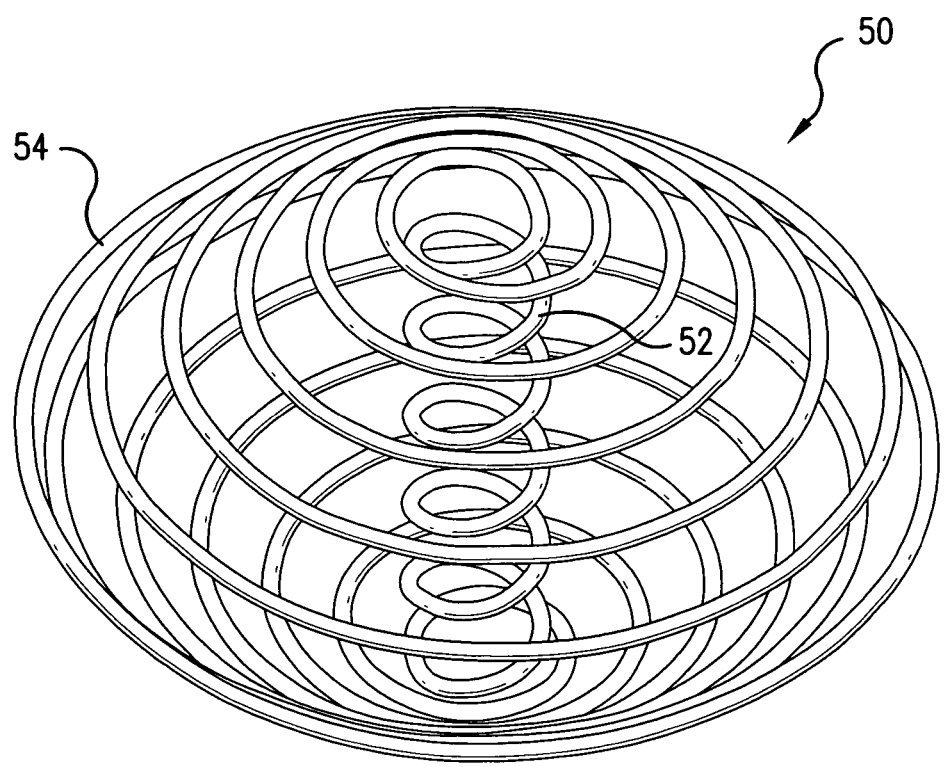
FIG. 4a is a top perspective view of a spherical agitator according to the present invention.

Other embodiments contemplate the use of multiple or variously shaped and sized spring agitators. Referring to FIG. 4a, one embodiment uses circular spring agitator 50, which includes internal 52 and external 54 coils that are made of one continuous piece of material.

Figure 4B:
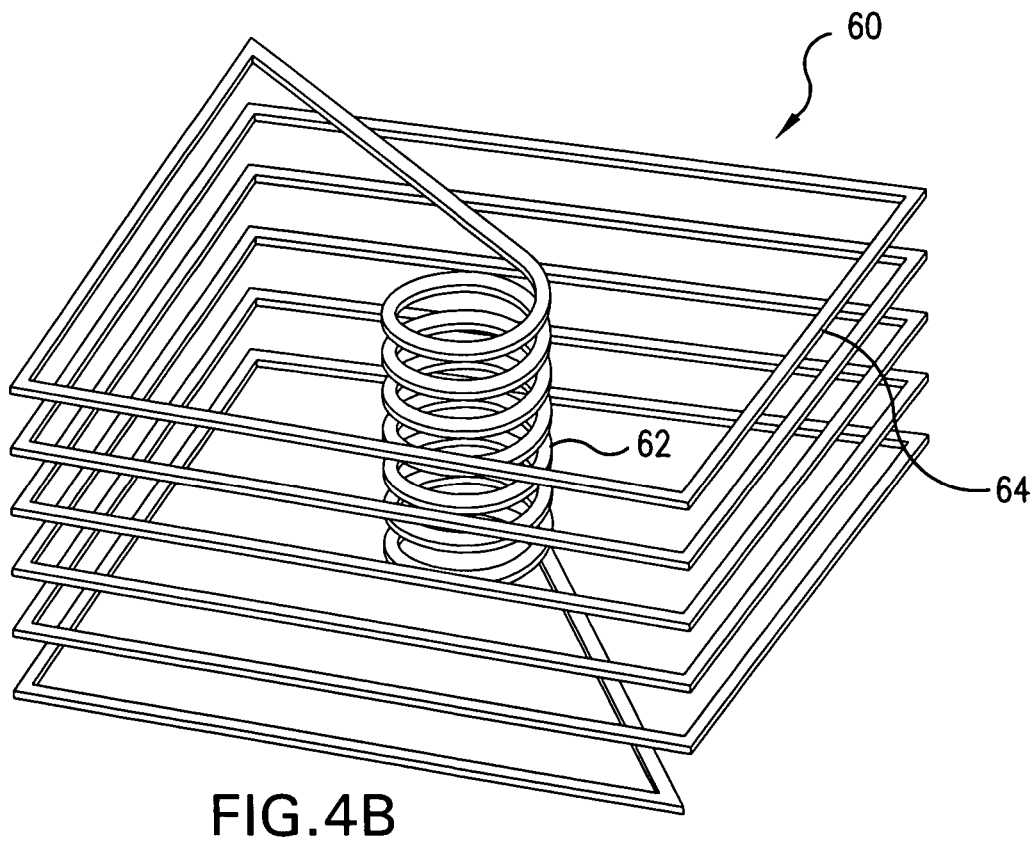
FIG. 4b is a top perspective view of a cubical agitator according to the present invention.

Referring to FIG. 4b, an alternate embodiment uses cubical spring agitator 60, which includes internal 62 and external 64 coils that are made of one continuous piece of material.

Figure 5:
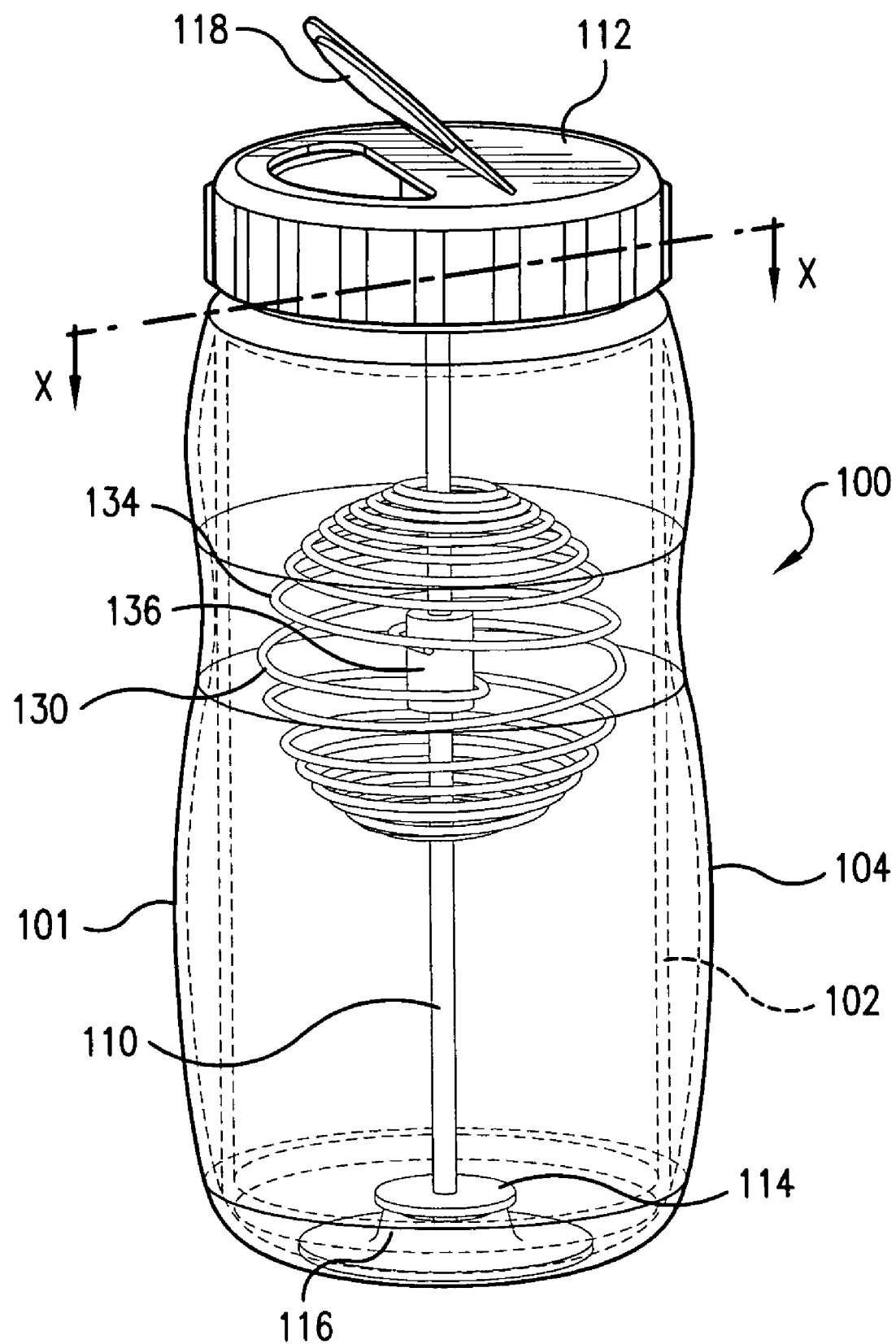
FIG. 5 is a side perspective view of another shaker and agitator according to the present invention.

Referring to FIG. 5, shaker 100 includes mixing vessel 101 screw on lid 112, guide rod 110, and mixing element 130. Mixing element 130 more specifically includes spherically-shaped external coil 134 and internal slide weight 136, which attaches to, and slides along, guide rod 110.

Figure 6:
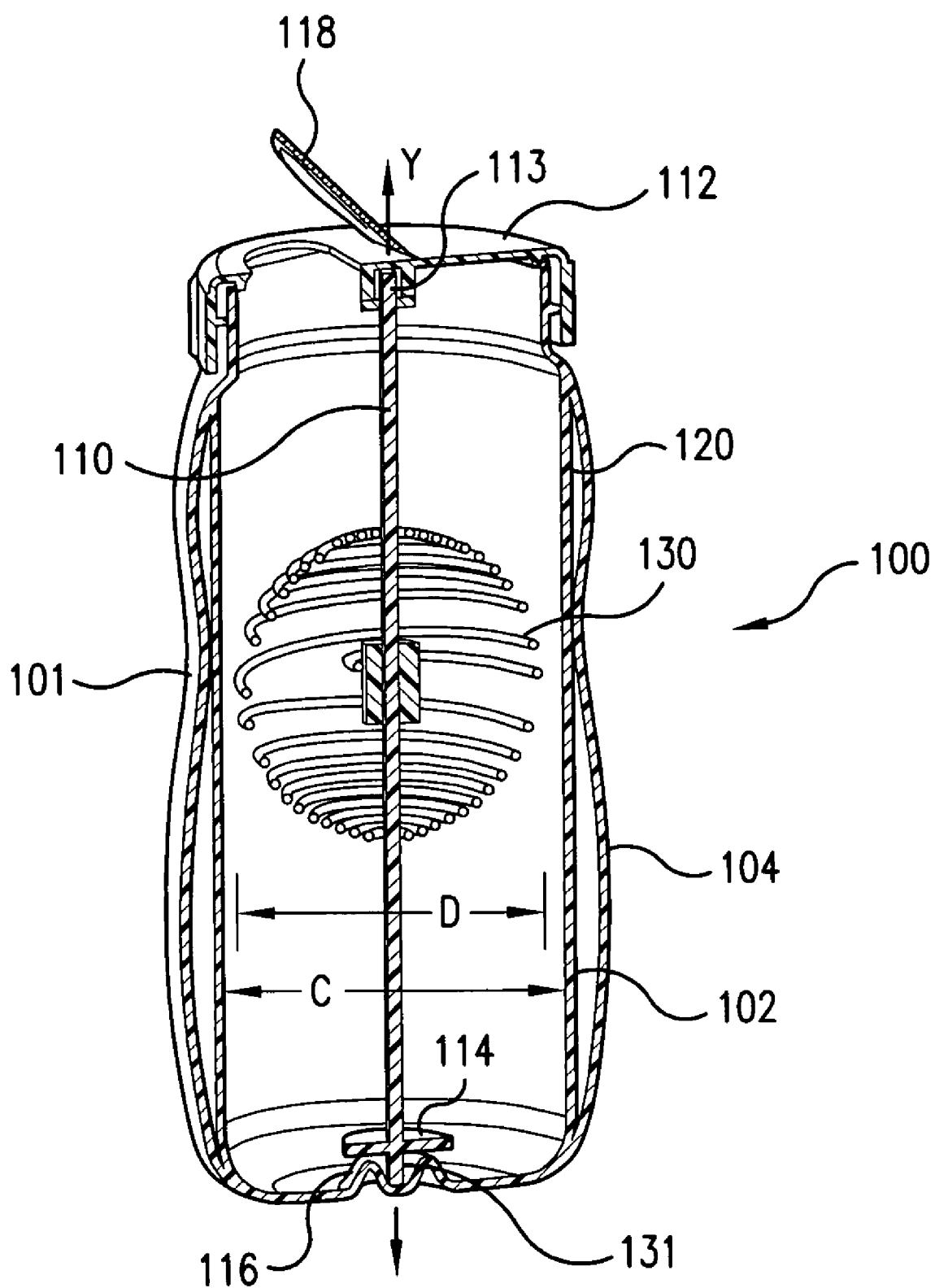
FIG. 6 is a side perspective cross-sectional view of the shaker and agitator in FIG. 5 along the plane designated by bisecting line X-X.

Referring to FIG. 6, shaker 100 also includes inner shell 102 and outer shell 104. Inner shell 102 comprises cylinder 120, which allows maximum efficiency in mixing. Outer diameter D of mixing element 130 is just slightly less than inner diameter C of cylinder 120. Outer shell 104 is ergonomically shaped to assist a user in shaking.

In various embodiments, the two shell design can be used to provide different properties to each shell. For example, inner shell 102 is very rigid, while outer shell 104 is softer and has a tacky feel to provide a more comfortable and secure grip, which makes shaking easier.

Rod 110 is removably attached to the inside center of lid 112 at notch 113. The raised area at the bottom of inner shell 102 contains depression 131, which helps securely seat rod 110 along center axis Y of inner shell 102. Rod 110 includes retaining flange 114 (or alternately another projection) just above base 116, which prevents mixing element 130 from falling off rod 110 when lid 112 is removed. Mixing element 130 can be separated from rod 110 by sliding it off of rod 110 after separating rod 110 from lid 112.

Snap spout cover 118 allows the contents of shaker 100 to be emptied without disturbing rod 110 or mixing element 130. Mixing element 130 is a stainless steel spring. Rod 110 is made from solid stainless steel.

In one embodiment, the guide rod is hollow, and it contains both agitator 130 and the liquid that is mixed.

Another aspect of the present invention is directed to an agitating element, the details and several embodiments of which are substantially described above.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments that would come within the spirit and scope of the present invention.

I claim:

1. A handheld shaker with reciprocating agitator, comprising:
 a mixing vessel, operatively containing a guide rod that runs from one end of the vessel to an opposite end of the vessel, and that is operatively connected to both such ends; and
 a hollow elastic agitator frame that operatively reciprocates from the one end of the vessel to the opposite end, and thereby mixes fluid contained within the vessel;
 wherein the hollow elastic agitator frame has a primary axis of elasticity along a single entire at rest vertical length, and the hollow elastic agitator frame comprises at least one internal attachment member that secures every segment of the single entire at rest vertical length of the hollow elastic agitator frame firmly to the guide rod, which minimizes sideways distortion and movement of the entire vertical length of the agitator frame.

2. The shaker of claim 1 wherein the internal attachment member slides along the guide rod.

3. The shaker of claim 2 wherein the agitator frame can slide onto, and off of, the rod.

4. The shaker of claim 1 wherein the agitator frame has an external mixing member, wherein the external mixing member and the internal attachment member are concentric coils.

5. The shaker of claim 4 wherein the concentric coils are made from one continuous piece of material.

6. The shaker of claim 4 wherein the agitator frame is diamond, circular, spherical, cube, polyhedral, or pyramid-shaped.

7. The shaker of claim 1 wherein the guide rod is substantially solid.

8. The shaker of claim 1 wherein the agitator frame operatively has its primary axis of elasticity parallel with the guide rod, and along which the frame contracts when it hits one of the vessel ends.

9. The shaker of claim 8 wherein the agitator frame has an external mixing frame comprised of concentric coils, wherein multiple coils can operatively touch the end of the vessel when the frame contracts against the end.

10. The shaker of claim 8 wherein the agitator frame has a spring that operatively impacts the vessel's ends only at its ends.

* * * * *